(12) United States Patent
Miyaki

(10) Patent No.: US 7,133,337 B2
(45) Date of Patent: Nov. 7, 2006

(54) METHOD FOR RECORDING DATA ON AN OPTICAL DISK BY USING A RUNNING OPTIMUM POWER CONTROL TECHNIQUE

(75) Inventor: Seiichiro Miyaki, Tokyo (JP)

(73) Assignee: NEC Corporation, Tokyo (JP)

( * ) Notice: Subject to any disclaimer, the term of this patent is extended or adjusted under 35 U.S.C. 154(b) by 611 days.

(21) Appl. No.: 10/647,381

(22) Filed: Aug. 26, 2003

(65) Prior Publication Data

US 2004/0156286 A1     Aug. 12, 2004

(30) Foreign Application Priority Data

Aug. 27, 2002   (JP)   ............................. 2002-246477

(51) Int. Cl.
  *G11B 5/09*    (2006.01)
  *G11B 7/00*    (2006.01)

(52) U.S. Cl. .................... 369/47.5; 369/59.11; 369/116

(58) Field of Classification Search .................... None
  See application file for complete search history.

(56) References Cited

U.S. PATENT DOCUMENTS 5,396,480 A * 3/1995 Morishita et al. ........... 369/116
5,732,062 A * 3/1998 Yokoi et al. ................. 369/116
2005/0099924 A1* 5/2005 Dekker et al. ........... 369/59.11

FOREIGN PATENT DOCUMENTS

| JP | 10-40548 A | 2/1998 |
|---|---|---|
| JP | 2001-18620 A | 1/2001 |
| JP | 2001-20097 A | 1/2001 |
| JP | 2001-351242 A | 12/2001 |

* cited by examiner

Primary Examiner—Muhammad Edun
(74) Attorney, Agent, or Firm—Sughrue Mion, PLLC

(57) ABSTRACT

A disk drive uses a running OPC control recording technique for obtaining an optimum recording power level. The disk drive irradiates an optical disk with an optical spot, detects a front power level and a rear power level of a reflected optical spot, calculates an index of the recorded state of the mark formed by the recording power of the optical spot, and controls the recording power based on the index of the recorded state.

31 Claims, 9 Drawing Sheets

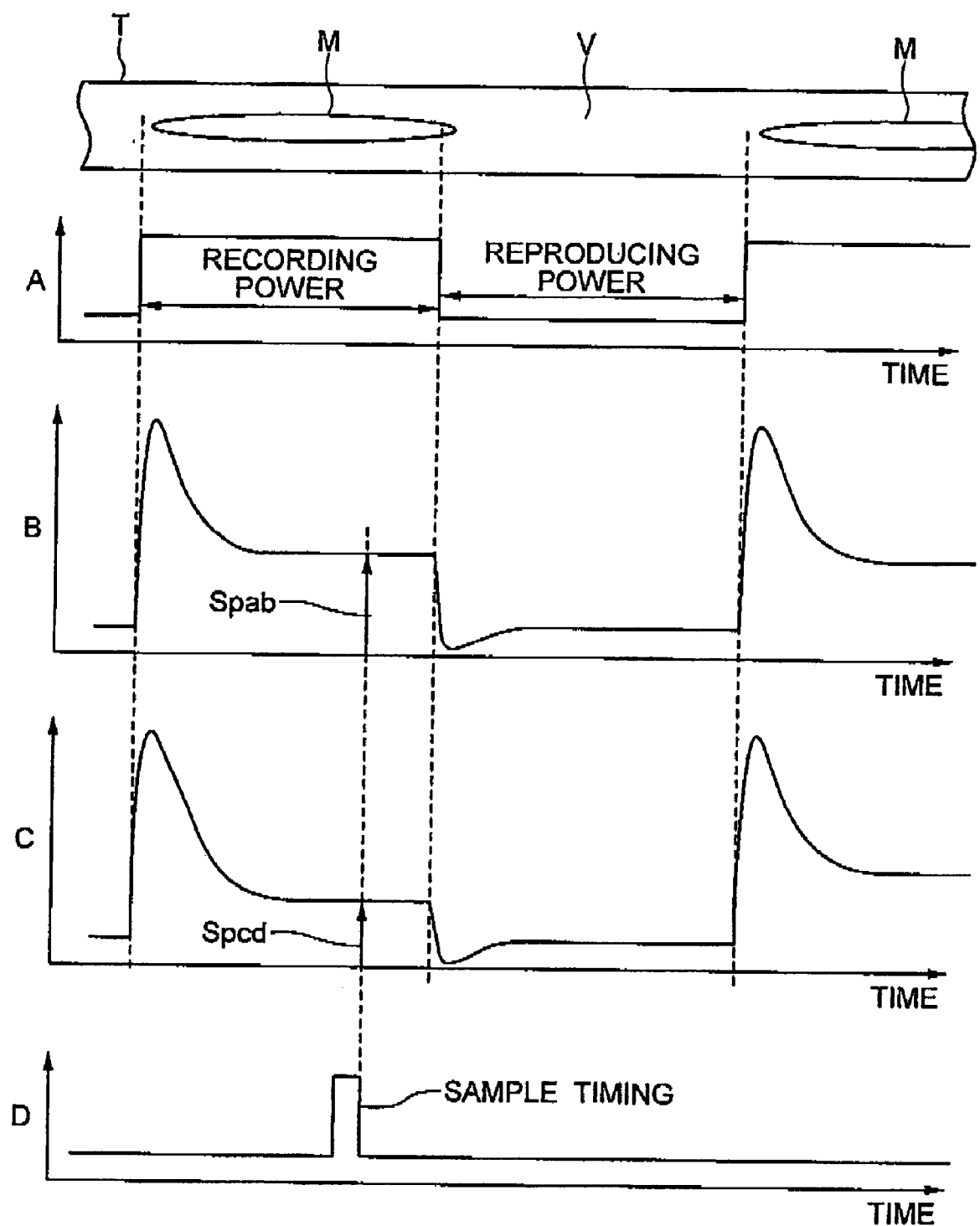

METHOD FOR RECORDING DATA ON AN OPTICAL DISK BY USING A RUNNING OPTIMUM POWER CONTROL TECHNIQUE

BACKGROUND OF THE INVENTION (a) Field of the Invention

The present invention relates to a method for recording data on an optical disk by using a running optimum power control (OPC) technique and, more particularly, to a technique for recording data on an optical disk by controlling the recording optical power based on the results of detection of the recorded state of data (mark) on the optical disk. Th present invention also is relates to an optical disk drive using the running OPC technique.

(b) Description of the Related Art

Known parameters representing the recorded state of the mark recorded on the track of an optical disk include "asymmetry" and "β", which represent the asymmetry of the waveform of the radio frequency (RF) signal reproduced from the optical spot reflected from the mark on the optical disk.

FIG. 10 exemplifies a graph of the power margin characteristic showing the relationship between the parameter β (%) and the jitter of the RF signal. It is shown therein that the jitter of the RF signal exceeds a threshold Th if the parameter β deviates from a suitable range. In FIG. 10, the power margin shown therein corresponds to the range of the parameter β (or asymmetry instead), which provides an allowable value for the jitter, i.e., below the threshold Th.

The power margin has a significant range of variation depending on the type of the optical disk. If the optical disk has a narrow range of power margin, it is required that the parameter β or asymmetry be more uniform and stable over the entire recording area of the optical disk, because a larger range of fluctuation in the parameter β or asymmetry causes a serious problem. Recently, along with the development of higher speed recording on the optical disk, there is a tendency of reduction of the power margin for the optical disk, thereby requiring more uniform and stable value for the parameter β over the entire recording area of the optical disk.

In the mean time, for achieving the higher speed recording, a zone-constant linear velocity (Z-CLV) recording scheme or constant angular velocity (CAV) recording scheme is generally used, which causes, however, a difficulty in the power control so as to obtain a suitable recorded state providing a uniform and stable parameter for β.

In the circumstances as described above, an optimum power calibration technique is generally used wherein trial data recording is performed in a selected power calibration area of the optical disk before actually recording desired data. The desired data is recorded on the recording area of the optical disk by using the fixed level of the optimum recording power obtained by the optimum power calibration technique.

In the optimum power control (OPC) technique, there may arise problems such that the characteristic of the optical disk fluctuates within the recording area, that the plane of the recording surface fluctuates due to radial skew or warp of the optical disk, that the OPC recording causes a temperature change of the optical disk to change the characteristic thereof, and that the V-CLV or CAV recording technique involves a velocity fluctuation during the OPC recording. Such problems do not provide an optimum recorded state irrespective of employing the OPC recording scheme.

For solving the above problems in the conventional techniques, a technique using a running OPC recording scheme is proposed wherein the recorded state is detected while the recording is performed on the optical disk by using a variety of techniques, thereby correcting the recording optical power based on the detected recorded state to maintain the optimum recorded state while running or continuing the recording.

Patent Publication JP-A-10-40548, for example, describes a running OPC recording technique wherein a maximum light intensity and a sampled light intensity of the optical spot reflected from a plurality of pits (marks) are detected over several frames in the actual recording area at the start of recording, a reference maximum light intensity and a reference sampled light intensity are then determined based on these detected intensities, and the laser power is corrected based on the results of comparison of a maximum light intensity and a sampled light intensity detected during the OPC recording against the reference maximum light intensity and the reference sampled light intensity, respectively, thereby achieving an accurate correction.

In the running OPC recording technique described in JP-A-10-40548, the reference maximum light intensity and the reference sampled light intensity are determined in the actual recording area, and used as fixed levels in the actual recording area, as described above. This causes a difficulty in controlling the recording optical power to obtain a stable and uniform recorded state in the whole actual recording area if the optical disk has a significant rage of variation in the disk characteristics or the plane of the disk surface fluctuates due to the inclined pivotal axis or warp of the disk.

JP Patent Application 2001-018620 proposes another running OPC recording technique wherein a signal representing the sum of the reflected optical power of the main beam is detected, and the stable level (Sp) of the reflected optical power obtained from the rear portion of the pit during the recording, the space level (Ss) of the reflected optical power obtained from the space during the recording and the power level of the laser at the objective lens are used as parameters for detecting the recorded state of the mark during the running OPC recording on the optical disk.

In the another running OPC recording technique described in JP Patent Application 2001-018620, since the space level (Ss) is used for correcting the fluctuation of the stable level (Sp) caused by fluctuation of the reflectivity of the disk, a stable reproducing power level is required during the recording operation for obtaining a stable correction. However, the reproducing power level, i.e., the reproducing optical power at the exit of the objective lens which is relatively low so as not to form a pit, is difficult to control at a fixed level due to an insufficient frequency characteristic of the front monitor. Thus, under the condition where the recording velocity changes, as in the case of Z-CLV or CAV recording scheme, the reproducing power level cannot be well controlled during the recording.

JP Patent Application 2001-020097 proposes another running OPC recording technique wherein side beams (sub-beams) are used instead of the main beam to obtain the parameters for detecting the recorded state during recording the data on the optical disk. In this technique, the recording optical power is controlled based on the ratio between the intensity of the front side beam and the intensity of the rear side beam, in view that the front side beam incident onto the unrecorded areas of the subject track and the adjacent outer track is reflected therefrom and the reflected beam is subjected to diffraction by the recorded pit and that the reflected beam of the rear side beam is subjected to the diffraction by the recorded pit.

In the technique described in Patent Application 2001-020097, since the side beams are used as the parameter for detecting the recorded state, there arises a problem in that the target value for the running OPC recording cannot be measured sometimes. More specifically, if the optical disk is a CD-R, it is prescribed that the OPC recording technique use test areas in the order from the peripheral area toward the central area without using the actual recording area. Thus, since the test area for the OPC test recording may be located adjacent to another test area for which OPC test waveform has been recorded, the front side beam is affected by diffraction only by the recorded track and not by the unrecorded area, whereby there is a difference between the cases of the OPC recording and the actual recording on the recording area. In addition, since the side beams are located between adjacent groove tracks to be recorded, or since a de-track amount may vary the amount of affection by diffraction by the adjacent track, the track pitch of the optical disk may be varied between the central area and the peripheral area of the disk, thereby preventing the stable running OPC recording.

It is to be noted that the running OPC technique of the present invention also uses well-known standard technologies such as described in JP-A-2001-351242 for recording data on the optical disk in addition to the technologies in the running OPC techniques as described above.

SUMMARY OF THE INVENTION

In view of the above problems in the conventional techniques, it is an object of the present invention to provide a running OPC recording process, which is capable of recording data on an optical disk while achieving excellent control of the recording power level to obtain a stable and uniform recorded state of data on the optical disk.

It is another object of the present invention to provide an optical disk drive using such an OPC recording process.

The present invention provides a method for recording data on an optical disk while using a running optimum power control (OPC), including the steps of: recording data on the optical disk by using an optical spot having a recording optical power and a reproducing optical power, the recording optical power and the reproducing optical power alternately occurring for generating a mark and a space, respectively, on the optical disk; detecting the optical spot reflected from the mark on the optical disk as a reflected optical spot during generating the mark; measuring a front power level representing an optical power of a front side of the reflected optical spot, and a rear power level representing an optical power of a rear side of the reflected optical spot; and controlling the recording optical power of the optical spot based on the front power level and the rear power level.

The present invention also provides a optical disk drive for driving an optical disk by using a running optical power control (OPC), including: an optical system for irradiating an optical disk with an optical spot having a recording optical power and a reproducing optical power, the recording optical power and the reproducing optical power alternately occurring for generating a mark and a space, respectively, on a track of the optical disk; a photodetector for receiving the optical spot reflected from the optical disk as a reflected optical spot, said photodetector having a plurality of sensor areas divided at least in a tangential direction of the track; and an OPC block for receiving outputs of the photodetector to detect a front power level and a rear power level of the reflected optical spot, wherein the OPC block detects a recorded state of the mark by calculating an index of the recorded state based on the front power level and the rear power level, and controls the recording optical power based on the index of the recorded state during the running OPC.

In accordance with the method and disk drive of the present invention, since the running OPC recording is performed on the optical disk by controlling the recording optical power of the optical spot based on the front power level and the rear power level of the reflected optical spot, which correctly represent the recorded state based on the difference or ratio etc. between the optical powers of the front side and the rear side of the reflected optical spot now recording data on the optical disk, a stable and uniform recording operation can be achieved on the optical disk by using a simple running OPC recording process.

The above and other objects, features and advantages of the present invention will be more apparent from the following description, referring to the accompanying drawings.

BRIEF DESCRIPTION OF THE DRAWINGS

FIG. 2 is a timing chart showing waveforms of signals in the running OPC recording process of FIG. 1 in association with the arrangement of the mark (M) and space (V) on the recording track.

PREFERRED EMBODIMENT OF THE INVENTION

Figure 1A:
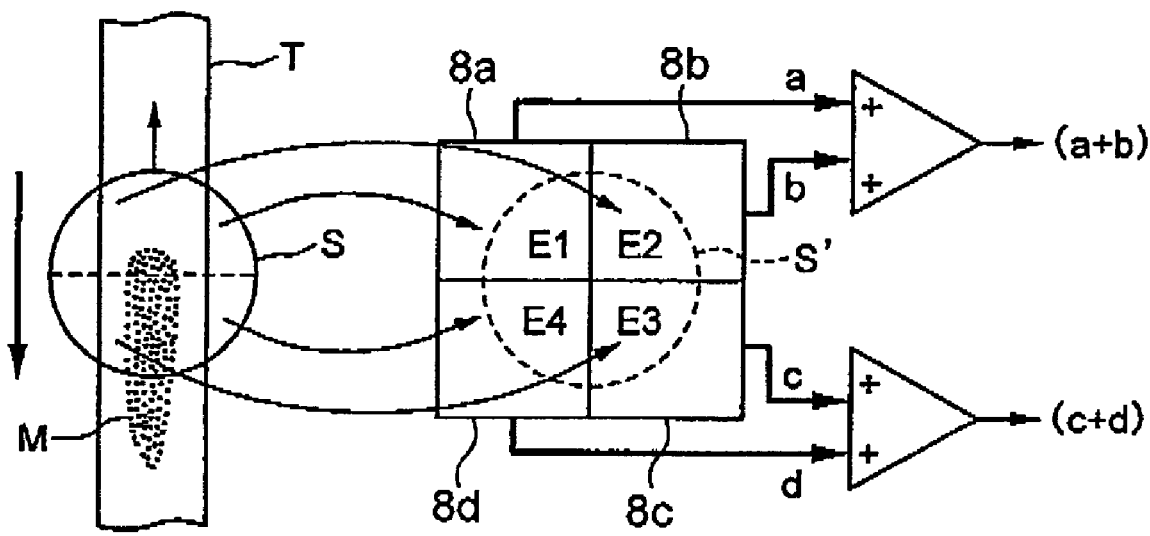
FIG. 1A is a schematic top plane view illustrating the function of an embodiment of the present invention using a running OPC recording process, while showing the locational relationship between an optical spot and a recording track, a photodetector receiving the reflected optical spot from the recording track, and a pair of amplifiers receiving signals from the photodetector.

Before describing an embodiment of the present invention, the principle of the present invention will be described hereinafter for a better understanding of the present invention.

The present invention is directed to a running OPC recording process, wherein the recording power of the optical spot is controlled based on the results of detection of the recorded state of data while recording desired data on a recording track of an optical disk. In this process, the main beam of the laser reflected from the track is employed for controlling the recording power level of the optical spot by using of a plurality of received light intensities of the reflected optical spot, which are obtained by dividing the received main beam along the tangential direction of the recording track. The received light intensities are used herein to calculate the indexes of the recorded state of data.

The plurality of received light intensities include at least a power level (front power level) of the front side of the reflected main beam and a power level (rear power level) of the rear side of the reflected main beam, which are received by the receiving sub-areas of a combination photodetector. Both the front and rear power levels are obtained from a single pit recorded on the is recording track at that time. The control of the recorded state may be performed based on either a combination of the front power level (Spab), rear power level (Spcd) and recording power (Pr), a combination of the front power level (Spab), rear power level (Spcd), recording power (Pr) and recording velocity (Lv), or a combination of the front power level (Spab), rear power level (Spcd), recording power (Pr) and a correction factor (k) calculated from the recording velocity as an inherent value for the specific recording condition.

The index of the recorded state is calculated similarly thereto, i.e., either a combination of the front power level (Spab), rear power level (Spcd) and recording power, a combination of the front power level (Spab), rear power level (Spcd), recording power and recording velocity (Lv), or a combination of the front power level (Spab), rear power level (Spcd), recording power (Pr) and a correction factor (k) calculated from the recording velocity as an inherent value for the specific recording condition.

More specifically, the index of the recorded state is determined either by the ratio between the front power level (Spab) and the rear power level (Scd), i.e., Spab/Spcd or Spcd/Spab, by the ratio between the Spab/Spcd and the n-th power of the recording power (Pr), i.e., $(Spab/Spcd)/Pr^n$, $(Spcd/Spab)/Pr^n$, $Pr^n/(Spab/Spcd)$ or $Pr^n/(Spcd/Spab)$ given n being the sensitive factor in the OPC recording, or by the ratio between the Spab/Spcd or Spcd/Spab and a specific value calculated from the n-th power of the recording power level and the correction factor (k), e.g., $Pr^n \times k$, ,i.e., $(Spab/Spcd)/Pr^n \times k$, $(Spcd/Spab)/Pr^n \times k$, $Pr^n \times k/(Spab/Spcd)$ or $Pr^n \times k/(Spcd/Spab)$.

It is preferable that the sensitive factor (n) of the running OPC recording process be finely adjusted at an optimum value for each type of the optical disks or conditions of the recording, whereby the degree of control of the running OPC is adjusted for each type of the optical disks. In an alternative, it is preferable either to employ the calculated value for the index of the recorded state as the target value for the index during the trial recording using the optimum recording power on the PCA, to employ the calculated value for the index of the recorded state as the target value of the index during calibration of the optimum recording power before actual recording on the recording area of the track, or to employ the calculated value for the index of the recorded state as the target value for the index just after starting the recording operation on the recording area of the recording track. The recording power may be preferably controlled so as to obtain a minimum difference between the index of the recorded state detected at a desired timing, such as continuously, a specified interval or at random, and the target value for the index, It is preferable that the index of the recorded state be measured for at least one revolution of the optical disk and the mean value of the detected indexes obtained for the at least one revolution be used as the detected value for the index. It is also preferable that the parameter for calculating the average of the indexes be measured for at least one revolution of the optical disk and the average of the detected parameters be used for calculating the average of the indexes.

Now, the present invention is more specifically described with reference to accompanying drawings.

Referring to FIG. 1A, an optical spot "S" is incident from an optical head (not shown) onto a recording track "T" of an optical disk, which is implemented by a groove track and having therein a mark (or pit) "M" recorded by a recording power of the optical spot S. The optical spot S is reflected from the recording track T including thereon the mark M, and received by the sensor area of a combination photodetector 8 having four divided sensor sub-areas 8a, 8b, 8c and 8d. In the present embodiment, the photodetector 8 is divided by half in the tangential direction of the recording track and also divided by half in the direction (radial direction) normal to the tangential direction of the recording track. The reflected optical spot S' is received by each of the sub-areas 8a, 8b, 8c and 8d. Each two of the sub-areas 8a, 8b, 8c and 8d of the photodetector 8 juxtaposed in the radial direction supply in combination detected signals to one of the amplifiers, which adds the received input signals together.

It is to be noted that the recording track T moves in the downward direction as viewed in the drawing due to the rotation of the optical disk, and it may be said that this movement causes the optical spot S to move in the upward direction relative to the mark M on the recording track which stays still. The sub-areas 8a and 8b receiving the front side of the reflected optical spot S' is denoted by E1 and E2, whereas the sub-areas 8c and 8d receiving the rear side of the reflected optical spot S' are denoted by E3 and E4 in FIG. 1A. The first amplifier which receives optical signals from the sub-areas 8a and 8b receiving the front side of the reflected optical spot S' delivers an optical intensity (a+b), whereas the second amplifier which receives optical signals from the sub-areas 8c and 8d receiving the rear side of the reflected optical spot S' delivers an optical intensity of (c+d).

Figure 1B:
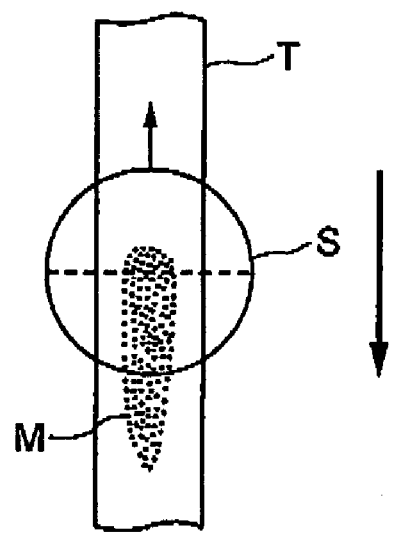
FIG. 1B is a top plan view showing the locational relationship between the optical spot and another recording track having a larger mark compared to the mark shown in FIG. 1A.

Referring to FIG. 1B, the optical spot S shown therein has a higher recording optical power compared to the optical spot shown in FIG. 1A, whereby a mark having a larger size compared to FIG. 1 is formed in FIG. 1B.

Referring to FIG. 2, there are shown signals A to D in relation to the location of the optical spot relative to the recording track having thereon mark M and space V. Signal A is a power control signal representing the power of the optical spot and assuming a higher level which allows the optical spot to have a recording optical power and a lower level which allows the optical spot to have a reproducing optical power, that is lower than the recording optical power.

The higher power of the optical spot forms a mark M on the recording track, whereas the lower power of the optical spot leaves a space.

Signal B is an output signal from the first amplifier, representing the power level, (a+b), of the front side of the reflected optical spot S', which is the reflected light of the optical spot S recording the mark and space on the recording track. The optical power of the reflected optical spot sharply rises to a higher level corresponding to the high level of the optical spot, assumes a stable medium level due to the lower reflectance of the mark formed by the optical spot, and then falls to a lower level corresponding to the reproducing power level of the optical spot S. Signal B is sampled at a timing of the stable medium level thereof by using the falling edge of a sampling signal D to obtain the front power level (Spab) corresponding to the front side of the reflected optical spot.

Signal C is an output signal from the second amplifier, representing the power level, (c+d), of the rear side of the reflected optical spot S'. Signal C is sampled at the same timing of the sampling signal D for sampling signal B, to thereby obtain the rear power level (Spcd) corresponding to the rear side of the reflected optical spot.

The rear power level Spcd is lower than the front power level Spab because signal C has a lower stable level compared to the medium stable level of signal B due to the mark being formed by the recording power level of the optical spot S. More specifically, the locational relationship between the optical spot having a recording power level and the mark formed by the is optical spot is such that shown in FIG. 1A, wherein the photodetector 8 receives a higher optical intensity from the front side of the optical spot than from the rear side of the optical spot due to the mark being formed by the optical spot S and having a lower reflectance. Thus, the power level (Spab) of the front side of the reflected optical spot is higher than the power level (Spcd) of the rear side of the reflected optical spot. A higher recording power level of the optical spot provides a larger difference between the front power level Spab and the rear power level Spcd due to the larger mark formed by the higher power level, as will be understood from FIG. 1B.

Figure 3:
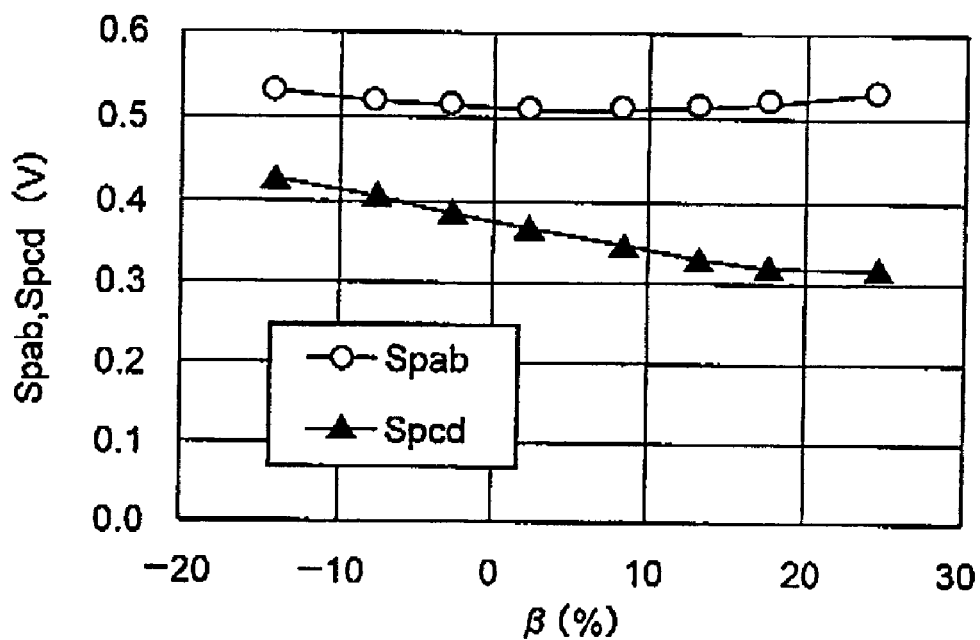
FIG. 3 is a graph showing relationship between the parameter β (%) and power levels (Spad and Spcd) of the reflected front beam and the reflected rear beam in the present embodiment.

FIG. 3 shows the relationship between the parameter β (%) of the mark and the front and rear power levels Spab and Spcd which are represented in terms of volts. The parameter β represents the recorded state of the mark or pit, wherein a higher value for β corresponds to a larger (deeper) mark obtained by a higher recording power level. The graph is obtained by changing the recording power level of the optical spot.

In FIG. 3, the parameter β represents the size of the pit completed by the optical spot, Spab represents the power level reflected from the track having the pit under construction, and Spcd represents the power level reflected from the track having the pit substantially completed. As understood from FIG. 3, a larger value for β, i.e., a larger pit provides a larger value for the difference between the front power level Spab and the rear power is level Spcd.

Figure 4:
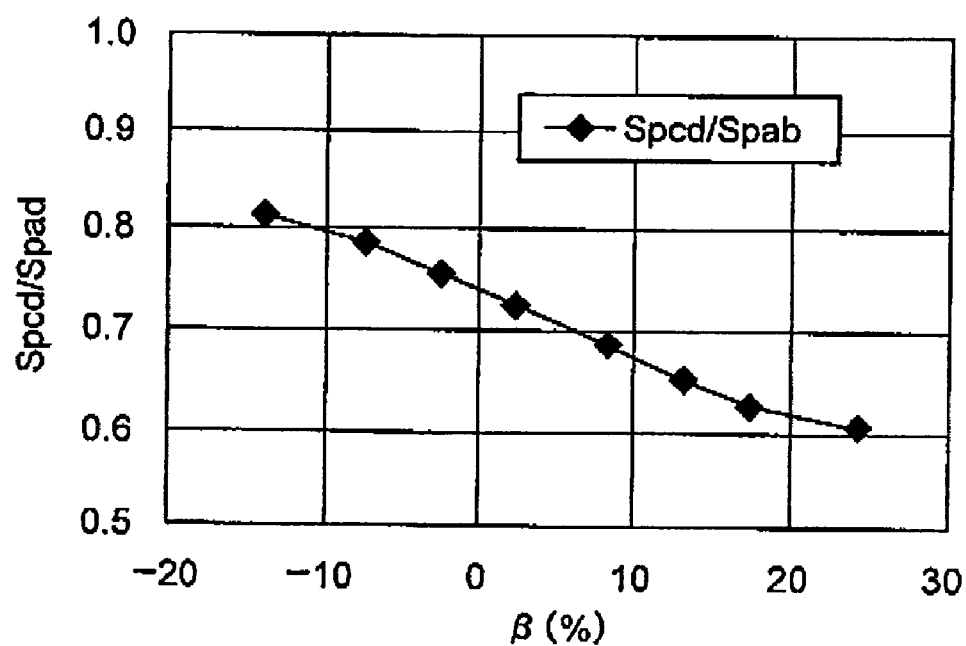
FIG. 4 is a graph showing relationship between the parameter β (%) and the ratio of Spcd to Spad in the present embodiment.

FIG. 4 shows the relationship between the parameter β and the ratio Spcd/Spab between the rear power level Spcd and the front power level Apab of the reflected optical spot, wherein a larger value for β provides a lower value for the ratio Spcd/Spab, as will be understood from the moderate and continual declining curve in FIG. 4.

By taking advantage of the relationships shown in FIGS. 3 and 4, the index of the recorded state can be calculated from the front power level Spab and the rear power level Sped, or from these levels Spab and Spcd together with the recording power of the optical spot if desired. The calculated index is used as a target index of the recorded state for controlling the recording power level of the optical spot during the running OPC recording technique. This provides a stable and uniform recorded state over the entire recording area of the optical disk without using a complicated calculation or process.

Figure 5:
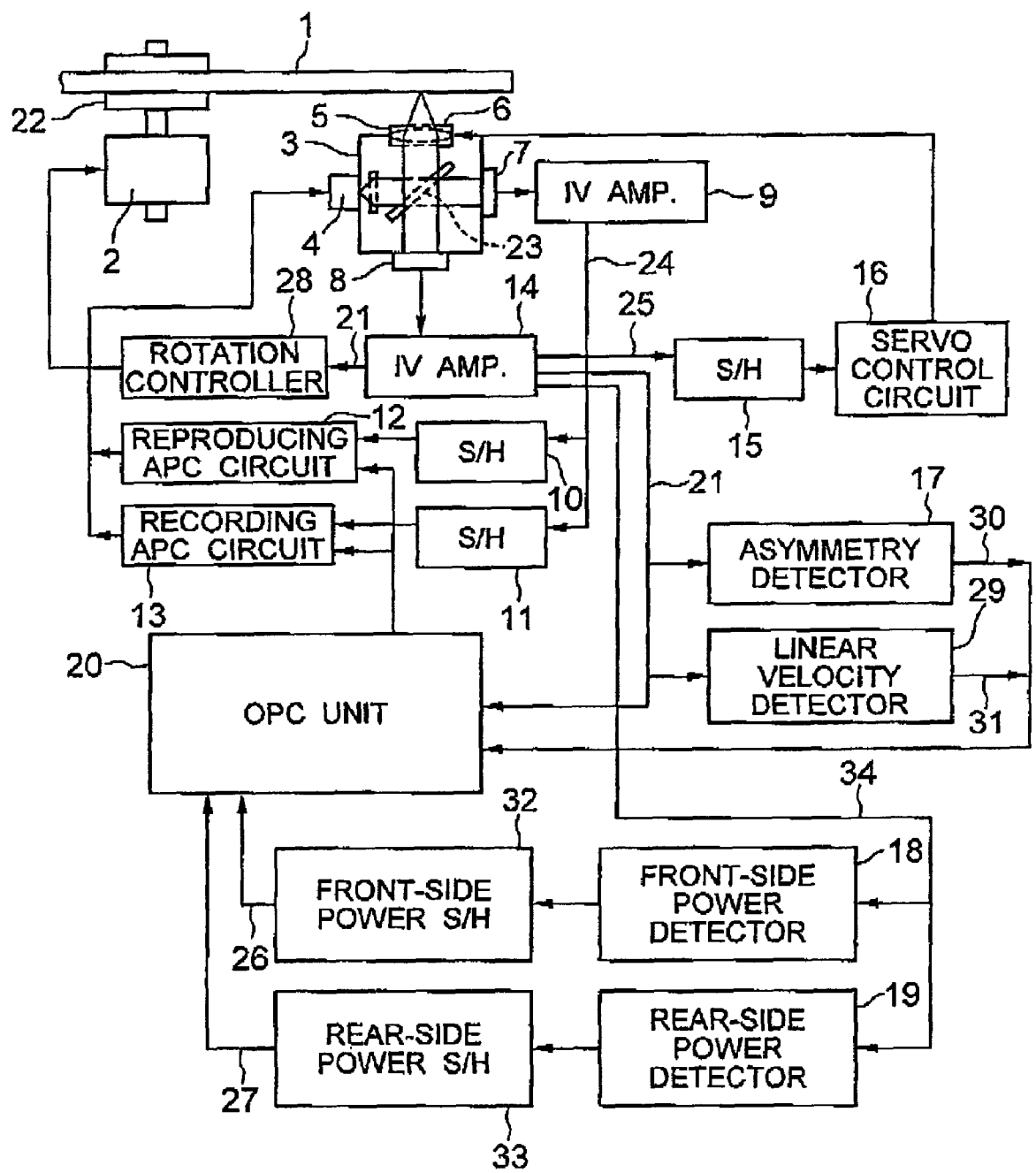
FIG. 5 is a block diagram of an optical disk drive used for implementing the method of the present embodiment.

Referring to FIG. 5, there is shown an optical disk drive including a running OPC recording system according to an embodiment of the present invention.

The optical disk drive is used for driving an optical disk 1 on a turn table 22 rotated by a spindle motor 2, and reading/writing data on the optical disk 1 by using an optical head 3.

The optical head 3 mounts thereon a laser diode (LD) 4, which irradiates the optical disk 1 with a laser beam via a half mirror 23 and an objective lens 5, which is disposed in a trucking/focusing unit 6. The objective lens 5 forms a focus of the laser beam onto the recording surface of the optical disk 1, which reflects the laser beam toward a photodiode (PD) 8 via the objective lens 5 and the half mirror 23. The light intensity or optical power of the reflected optical beam is received and detected by the photodiode 8 having divided photosensitive sub-areas, the output signals of which are converted by I–V conversion from current signals to voltage signals in an IV amplifier block 14.

The voltage signals thus generated in the IV amplifier block 14 are delivered to a rotation control section 28 after summing the voltage signals, the rotation control section 28 controlling the rotational velocity of the optical disk 1 for reproducing the recorded data. The voltage signals are also delivered from the IV amplifier block 14 to a plurality of sections including a linear velocity detector 29, which detects the linear velocity or linear velocity ratio corresponding to the recording speed to generate a linear velocity signal 31, an asymmetry detector 17 which detects the asymmetry of the pit to generate an asymmetry signal 30, and an OPC unit 20 which effects an OPC recording process by calculating the index of the recorded state and controlling the power levels of the recording power and the reproducing power of the optical spot, i.e., main laser beam. The voltage signals from the IV amplifier block 14 include a servo control signal 25 controlling a tracking/focusing unit 6 via sample/hold circuit 15 and servo control circuit 16. The tracking/focusing unit 6 has a focusing function for focalizing the laser beam onto the optical disk 1 and a tracking function for allowing the laser beam spot to follow a track of the optical disk 1.

The optical head irradiates the optical disk 1 with the reproducing power level for leaving a space, which are alternately incident onto the optical disk 1. The voltage signal representing the intensity of the reflected optical spot obtained from the emitted optical spot having the reproducing power level is sampled by the sample/hold circuit 15 as a servo control signal. The servo control signal is processed by the servo control circuit 16 for driving the tracking/focusing unit 6 of the optical head 3, whereby the objective lens 5 is controlled for allowing the laser beam spot to follow a specified location of the optical disk 1. It is to be noted that a thread unit (not shown) is also provided for moving the optical head 3 based on a rough tracking control.

The part of the optical beam which is passed through the half mirror 23 is incident directly onto the front monitor photodiode 7, which converts the optical intensity of the part of the optical beam into a current signal for detecting the optical intensity of the laser beam emitted by the laser diode 4. Another IV amplifier 9 converting the current signal from the photodiode 9 into a voltage signal delivers a front monitor signal 24 for is controlling the laser beam intensity at a fixed level in an auto power control (APC) technique. The front monitor signal 24 is delivered via a sample/hold circuit 10 to a reproducing APC circuit 12, the output of which is delivered to the laser diode 4. The front monitor signal 24 is also delivered via a sample/hold circuit 11 to a recording APC circuit 13, the output of which is also delivered to the laser diode 4.

In operation for recording data on the optical disk 1, the laser diode 4 emits a laser beam having a recording power and a reproducing power which occur alternately with each other. Each of the sample/hold circuits 10 and 11 holds the front monitor signal 24 during emission of the recording power and emission of the reproducing power, and delivers the sampled signal to a corresponding one of the reproducing and recording APC circuits 12 and 13. For each of the reproducing and recording APC circuits 12 and 13, a target power level is set by an OPC unit 20 having a recording/reproducing power control function, whereby the intensity of the laser beam is controlled at these target power based on the sampled front monitor signal 24 by using an APC technique. During emission of the reproducing power level, the reflected optical signal 21 is delivered to the asymmetry detector 17, which detects asymmetry (or β) of the reproduced waveform.

The outputs from the IV amplifier block 14 include signals 34, which include signals "a" to signal "d", such as shown in FIG. 1, obtained by divided sub-areas of the photodetector 8.

Signal "a" and signal "b" of signals 34 are delivered to a front-side power detector 18, which adds signal "a" and signal "b" together to generate a front-side power signal representing the optical intensity of the front side of the reflected optical spot. Signal "c" and "d" of signals 34 are delivered to a rear-side power detector 19, which adds signal "c" and signal "d" together to generate a rear-side power signal representing the optical intensity of the rear side of the reflected optical spot. Sample/hold circuit 32 receives the front-side power signal to sample the same at a specified timing to deliver a front power level signal 26 having information of the front power level Spabc to the OPC unit 20, whereas sample/hold circuit 33 receives the rear-side power signal to sample the same at the specified timing to deliver a rear power level signal 27 having information of the rear power level Spcd to the OPC unit 20.

The OPC unit 20 performs a running OPC recording based on the front power level Spab of the front power level signal 26 and the rear power level Spcd of the rear power level signal 27. If desired, the OPC unit 20 may additionally receive information of the recording power level, asymmetry signal 30 delivered from lo the asymmetry detector 30, a linear velocity signal 31 delivered from the liner velocity detector 29 and a correction factor (k) which is obtained as an inherent value under the specified recording condition based on the linear velocity. In such a case, the OPC unit 20 calculates the index of the recorded state based is on such information, and controls the optical power of the optical spot emitted by the laser diode 4 via the reproducing and recording APC circuits 12 and 13 for effecting a running OPC recording.

The feedback loops formed by the photodiode 8, IV amplifier block 14, front-side power detector 18, sample/hold circuit 32, rear-side power detector 19, sample/hold circuit 33, OPC unit 20, reproducing APC circuit 12 and recording APC circuit 13 constitute a running OPC block.

The running OPC block calculates an index of the recorded state based on the front power level Spab and rear power level Spcd. The running OPC block may additionally use the recording power for calculating the index of the recorded state. Further, the running OPC block may additionally use the liner velocity which is obtained by feedback loops including the photodiode 8, IV amplifier block 14, liner velocity detector 29, OPC unit 20, reproducing APC circuit 12 and recording APC circuit 13 for calculating the index of the recorded state. The running OPC block may use additionally a correction factor (k) obtained as an inherent value under the specified recording condition which is detected by measuring the linear velocity or linear velocity ratio of the optical disk.

The running OPC block may use front power level Spab, rear power level Spcd and recording power, front power level, rear power level, recording power and linear velocity, or may use instead of the linear velocity a correction factor obtained by measuring the linear velocity, for calculating the index of the recorded state.

The index of the recorded state may be calculated by either the ratio between the front power level (Spab) and the rear power level (Scd), i.e., Spab/Spcd or Spcd/Spab, by the ratio between Spab/Spcd or Spcd/Spab and the n-th power of the recording power (Pr), i.e., (Spab/Spcd)/$Pr^n$ or (Spcd/Spab)/$Pr^n$, given n being the sensitive factor in the OPC recording, or by the ratio between Spab/Spcd or Spcd/Spab and a calculated value from the n-th power of the recording power and the correction factor (k), e.g., $Pr^n \times k$.

The running OPC block may adjust the sensitive factor of the running OPC recording at an optimum value for each type of the optical disks or conditions of the recording, in order to obtain an optimum degree of control for each type of the optical disks, or to calculate the target value for the index based on the calculation from the index detected in the running OPC recording. This may be performed as a calibration running OPC recording in the PCA area while using the optimum power, or a calibration running OPC recording before starting the recording onto the actual recording area, or after starting the recording onto the actual recording track. The recording power may be preferably controlled so as to obtain a minimum difference between the index of the recorded state detected at a desired timing, such as continuously, at a specified interval or at random, and the target value for the index.

In either case, the running OPC block should preferably measure the index of the recorded value for at least one revolution of the optical disk and use the mean value of the detected indexes for the at least one revolution as the detected value of the index. The running OPC block should preferably measure the parameter for calculating the average of the indexes for at least one revolution of the optical disk, wherein the average of the detected parameters for the at least one revolution is used for calculating the average of the indexes.

FIGS. 6 to 9 show the procedure of the running OPC block as described above.

Figure 6:
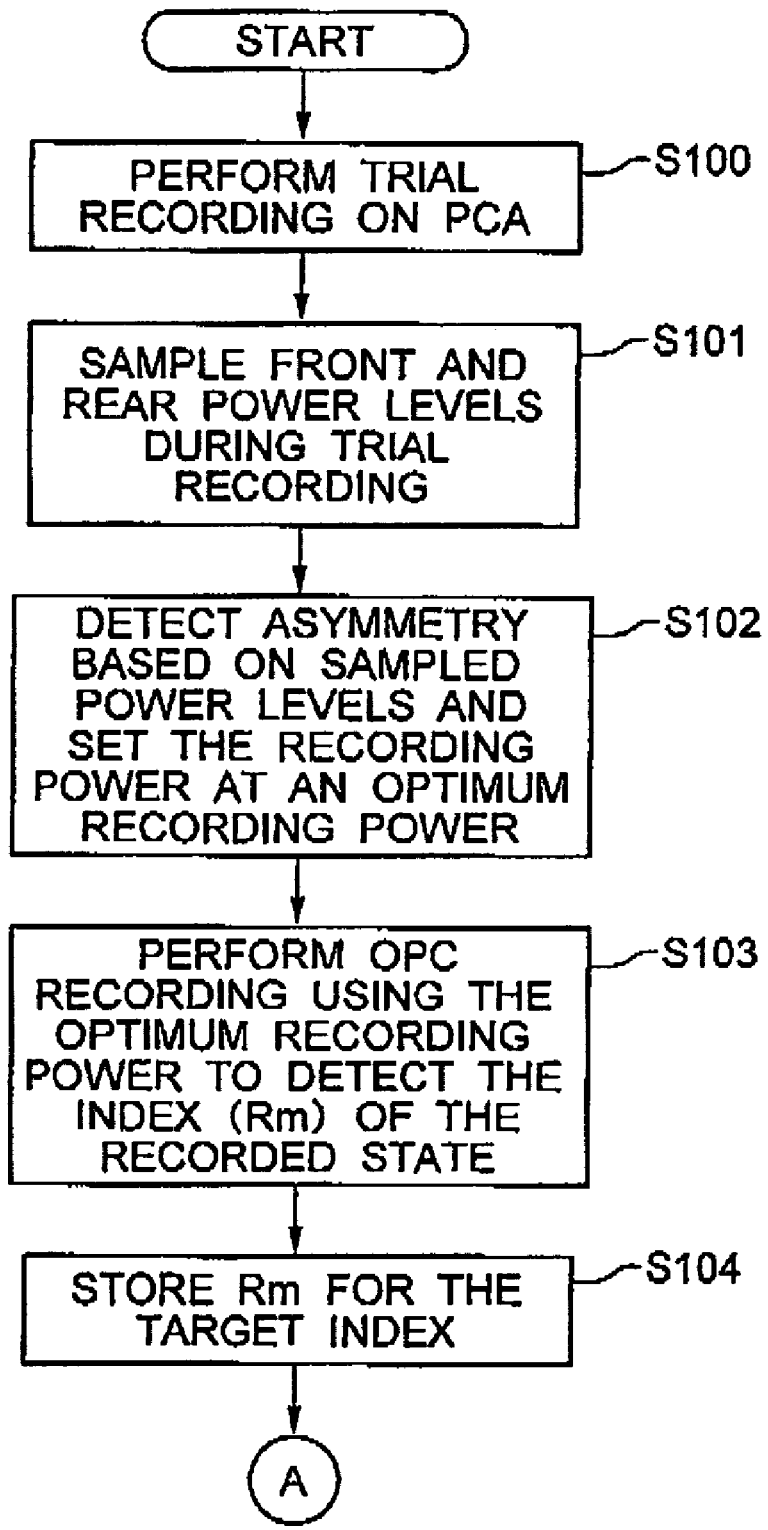
FIG. 6 is a flowchart of the method of the present embodiment for determining the target value for the index of recorded data.

FIG. 6 shows the procedure of obtaining the target value (Rt) for the index of the recorded state by forming a pit on a power calibration area (PCA) before recording actual data on a recording track for calibrating an optimum recording power (Pw0).

In step S100, a trial recording operation is performed on the PCA while changing stepwise the recording power of the optical spot by using the function of the running OPC block for controlling the recording power and reproducing power. During lo the recording operation, the sample circuits 32 and 33 sample the front- and rear-side power levels at a specified timing to obtain and store the front power level Spab and the rear power level Spcd (step S101). If desired, recording power and/or linear velocity (or linear velocity ratio) is also detected and stored in step S101. The asymmetry detector 17 calculates the asymmetry (or β) from the waveform of the reflected optical spot for each of the recording power levels. The optimum recording power (Pw0) is then obtained corresponding to the target asymmetry which is determined for the specific optical disk. Then, recording power (Pw1) is selected at the optimum recording power (Pw0) (step S102).

The signals obtained in the above steps are shown in FIG. 2, wherein the front power level Spab and rear power level Spcd are sampled from signals B and C representing the optical powers of the front side and rear side, respectively, of the reflected optical spot.

The front power level Spab is higher than the rear power level Spcd because the front-side optical power is higher than the rear-side optical power during the process of forming the mark by using the optical spot having a recording power. The stepwise change of the recording power is exemplified in FIGS. 1A and 1B, wherein a higher recording power forms a larger-size mark, which reduces the intensity or optical power of the reflected optical spot.

The OPC unit 20 receives the front power level Spab, rear power level Spcd and recording power which correspond to the optimum recording power (Pw0) measured, or receives in addition thereto the recording linear speed (Ls), to calculate the detected index (Rm) of the recorded state (step S103). The OPC unit 20 then stores the detected index (Rm) as the target value (Rt) for the index of the recorded state (step S104). The process advances to step S131 of FIG. 9

Figure 7:
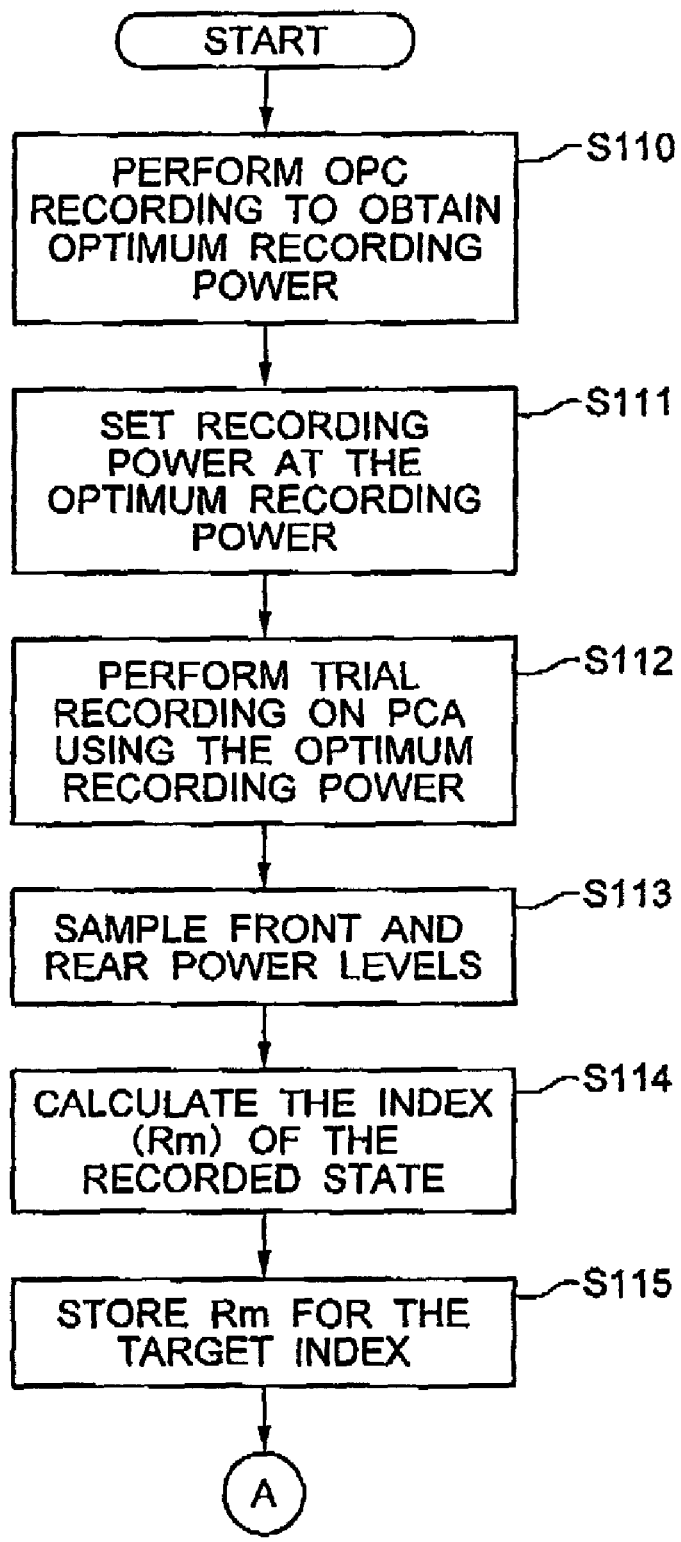
FIG. 7 is a modified flowchart of the method of the present embodiment for determining the target value for the index of recorded data.

FIG. 7 shows another procedure for obtaining the target value for the index of the recorded state.

In step S110, the OPC unit 20 calculates the optimum recording power (Pw0) by using an OPC recording technique. The OPC unit 20 then controls the recording power (Pw1) of the optical spot at the optimum recording power Pw0 for recording (S111).

Subsequently, a trial recording operation is performed in the PCA by using the recording APC circuit 13 for several frames, with the recording power (Pw1) set at the optimum recording power (Pw0) (step S112). During the trial recording, the front power level Spab and the rear power level Spcd are measured, together with or without the recording power and/or recording linear velocity (step S113).

The OPC unit 20 calculates the detected index (Rm) of the recorded state based on the front power level Spab and the rear power level Socd with or without the recording power and recording linear velocity (step S114). The OPC unit 20 sets the detected index Rm at the target index (Rt) of the recorded state. The process advances to step S131 of FIG. 9

Figure 8:
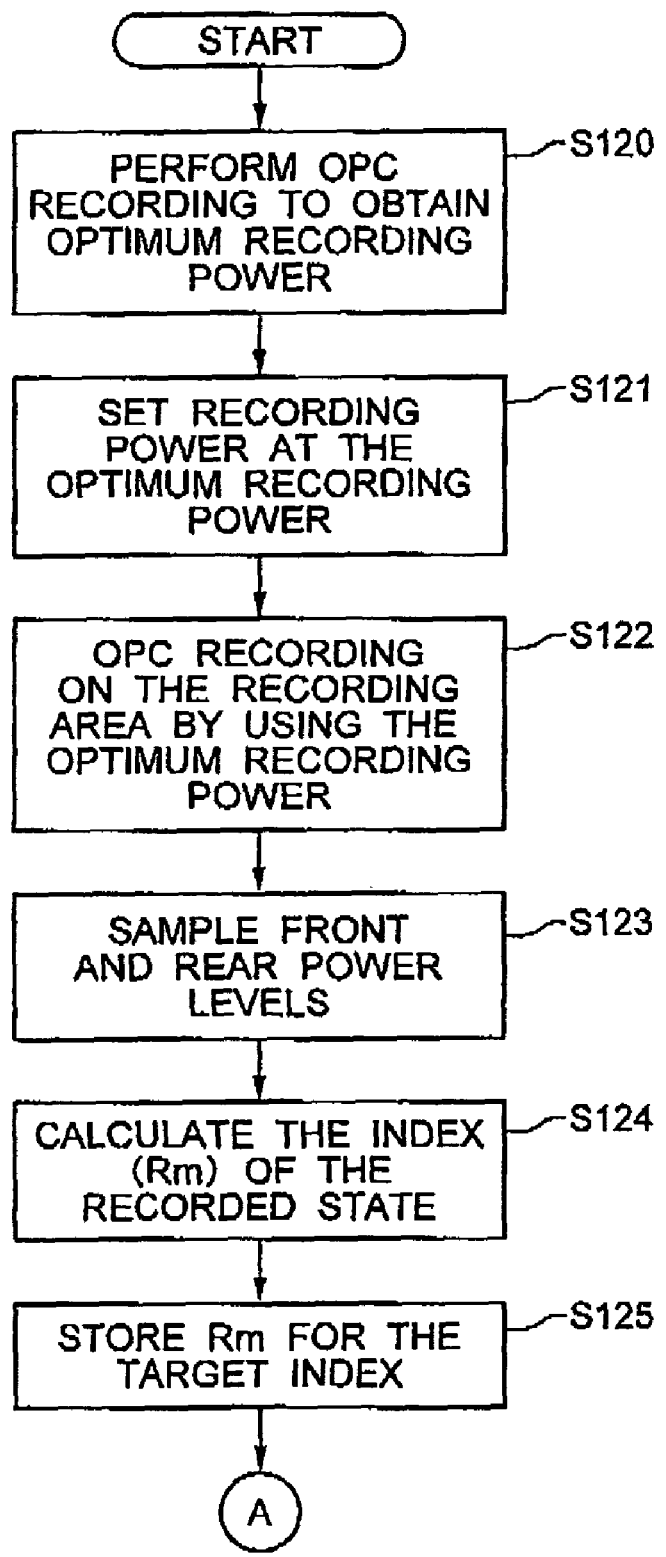
FIG. 8 is another modified flowchart of the method of the present embodiment for determining the target value for the index of recorded data.

FIG. 8 shows another procedure for obtaining the target value for the index of the recorded state.

In step S120, the OPC unit 20 calculates the optimum recording power Pw0 by using an OPC recording technique. The OPC unit 20 then sets the recording power Pw1 of the optical spot at the calculated optimum recording power Pw0 (step S121).

Subsequently, the OPC unit 20 performs OPC recording on a recording track of the optical disk, with the recording power Pw1 set at the optimum recording power Pw0 (step S122). During the OPC recording, the front power level Spab and the rear power level Spcc are measured together with or without the recording power and/or the recording linear velocity after the start of the recording (step S123).

The OPC unit 20 then calculates the detected index of the recorded state based on the front power level Spab and the rear power level Spcd with or without the recording power and/or the recording linear velocity (step S124). The OPC unit 20 then sets the detected index (Rm) at the target value (Rt) for the index of the recorded state (S125). The process advances to step S131 of FIG. 9.

Figure 9:
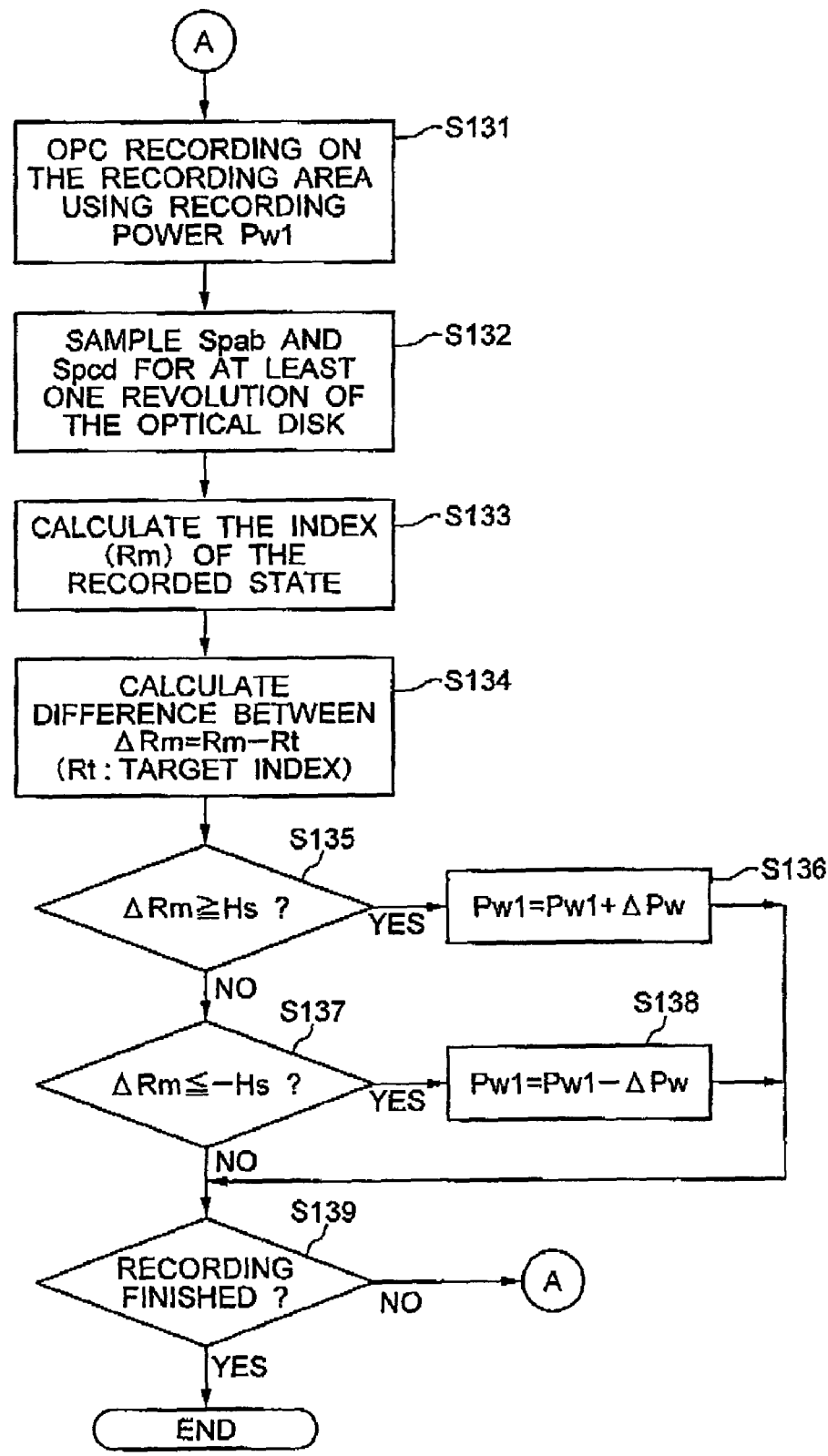
FIG. 9 is a flowchart of the method of the present embodiment for recording data after obtaining the target value.
Figure 10:
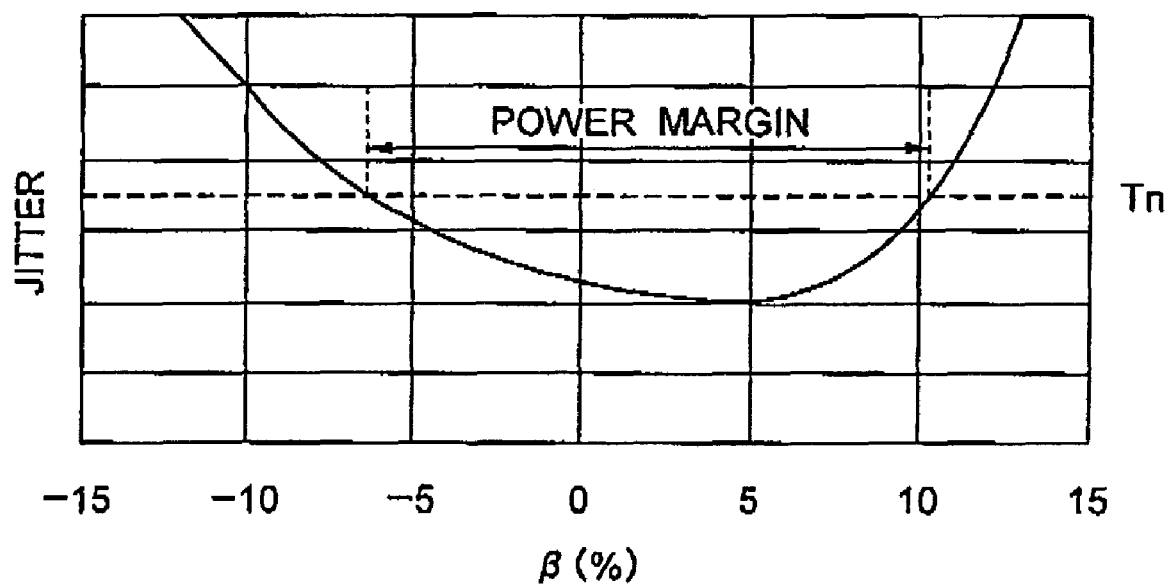
FIG. 10 is a graph showing the power margin characteristic in a conventional running OPC recording scheme.

After setting the target index of the recorded state by using any one of the procedures shown in FIGS. 6 to 8, a running OPC recording operation is performed based on the procedure shown in FIG. 9.

In step S131, a data recording operation is performed on an actual recording track while setting the recording power Pw1 of the optical spot at the optimum recording power Pw0 by using the recording/reproducing power control function of the OPC unit 20. During the data recording, the front power level Spab and the rear power level Spcd are measured with or without the recording power and/or the recording linear velocity for at least one revolution of the optical disk. The detected power levels etc. are averaged for the at least one revolution (step S132).

The OPC unit 20 then calculates the detected index of the recorded state based on the measured power levels Spab and Spcd etc (step S133). The OPC unit 20 then calculates a difference ($\Delta Rm = Rm - Rt$) between the detected index Rm and the target index Rt of the recorded state (step S134). It is to be noted that the parameters used for averaging the power levels etc. should be also measured for at least one revolution and averaged for the at least one revolution.

The OPC unit then compares the difference $\Delta Rm$ against a threshold (Hs) of the recording power control (step S135). If it is judged in step S135 that $\Delta Rm \geq Hs$ holds, then process advances to step S136, wherein the current recording power Pw1 is raised by a specified step $\Delta Pw$ up to Pw1+$\Delta Pw$. On the other hand, if it is judged in step S136 that $\Delta Rm < Hs$ holds, the process advances to step S137, wherein it is judged whether or not $\Delta Rm \leq -Hs$ hods. If it is judged in step S137 that $\Delta Rm \leq -Hs$ holds, the process advances to step S138, wherein the recording power Pw1 of the optical spot is lowered by the specified step $\Delta Pw$ down to Pw1-$\Delta Pw$, followed by advancing to step S139. If it is judged in step S137 that $\Delta Rm > -Hs$ holds, i.e., $-Hs < \Delta Pw < +Hs$ holds, the process advances to step S139 without changing the recording power Pw1, wherein it is judged whether or not unrecorded area exists. If it is judged in step S139 that the unrecorded area exists, the process returns to step S131, with the determined recording power being unchanged, to iterate the running OPC recording in the unrecorded area. On the other hand, if it is judged in step S139 that the unrecorded area does not exist, the process is ended.

In the above procedures, since the recording power Pw1 is first set at the optimum recording power Pw0 obtained by OPC recording technique and then controlled so that the detected index of the recorded state stays within an allowable deviation from the target index of the recorded state, the OPC recording process of the embodiment provides a stable and uniform recording in the entire recording area of the optical disk.

Several procedures for calculating the detected index Rm of the recorded state will be exemplified hereinafter. First, the detected index Rm may be obtained simply by the ratio between the rear power level and the front power level, i.e., Rm=Spcd/Spab or Rm=Spab/Spcd.

Second, the detected index Rm may be obtained by the ratio between Spcd/Spab or Spab/Spcd and the n-th power of the recording power Pw1, i.e., $Rm=(Spcd/Spab)/Pw1^n$ or Rm=(Spab/Spcd)/Pw1$^n$, where n is the sensitive factor of the running OPC control. This allows a subtle control in the running OPC recording.

Third, in the case where the optical disk allows application of a Z-CLV or CAV recording scheme, the correction factor (k) is measured beforehand as an inherent value under the recording condition depending on the strategy and linear velocity or linear velocity ratio. The correction factor k is introduced into the formula for calculating the detected index Rm of the recorded state. The formula including the correction factor k may be represented by:

Rm=(Spcd/Spab)/(Pw1$^n$×k); or

Rm=(Spab/Spcd)/(Pw1$^n$×k).

The correction factor k may be an operator instead of the constant.

Since the above embodiments are described only for examples, the present invention is not limited to the above embodiments and various modifications or alterations can be easily made therefrom by those skilled in the art without departing from the scope of the present invention. For example, the division of the sensor area of the photodetector may provide another area other than the front side and the rear side as described above, so long as the front side and the rear side are separated in the tangential direction of the recording track.

What is claimed is:

1. A method for recording data on an optical disk while using a running optimum power control (OPC), comprising the steps of:
   recording data on the optical disk by using an optical spot having a recording optical power and a reproducing optical power, said recording optical power and said reproducing optical power alternately occurring for generating a mark and a space, respectively, on the optical disk;
   detecting the optical spot reflected from the mark on the optical disk as a reflected optical spot during generating the mark;
   measuring a front power level representing an optical power of a front side of said reflected optical spot, and a rear power level representing an optical power of a rear side of said reflected optical spot; and
   controlling said recording optical power of said optical spot based on said front power level and said rear power level.

2. The method according to claim 1, wherein said controlling step includes calculation of a detected index of a recorded state of the mark.

3. The method according to claim 2, wherein said detected index is calculated from said front power level (Spab) and said rear power level (Spcd).

4. The method according to claim 3, wherein said detected index is obtained as a ratio Spab/Spcd or Spcd/Spab.

5. The method according to claim 2, wherein said detected index is calculated from said front power level (Spab), said rear power level (Spcd) and said recording optical power level (Pr).

6. The method according to claim 5, wherein said detected index is obtained as a ratio between Spab/Spcd or Spcd/Spab and Pr$^n$, given n being a sensitive factor of said running OPC.

7. The method according to any one of claims 6, wherein said sensitive factor of said running OPC is adjusted as an optimum value for each type of optical disks for adjusting a degree of control in said running OPC.

8. The method according to claim 2, wherein said detected index is calculated from said front power level, said rear power level, said recording optical power level and a linear velocity of the optical disk.

9. The method according to claim 8, wherein said detected index is calculated from said front power level (Spab), said rear power level (Spcd), said recording optical power (Pr) and a correction factor (k) which is calculated from said linear velocity as an inherent value for a specified recording condition.

10. The method according to claim 9, wherein said detected index is obtained as a ratio between Spab/Spcd or Spcd/Spab and a value calculated from said correction factor and Pr$^n$, given n being a sensitive factor of said running OPC.

11. The method according to claim 10, wherein a sensitive factor of said running OPC for calculating said detected index is adjusted as an optimum value for each type of optical disks for adjusting a degree of control in said running OPC.

12. The method according to claim 2, wherein said detected index detected in said running OPC is used as a target value for said index of recorded state during a calibration OPC on a power calibration area of the optical disk.

13. The method according to claim 2, wherein said detected index detected in said running OPC is used as a target value for said index of recorded state by using a calibration running OPC for calibrating an optimum recording optical power before starting actual recording on a recording area of the optical disk.

14. The method according to claim 2, wherein said detected index detected in said running OPC is used as a target value for said index of recorded state after staring actual recording on a recording area of the optical disk by using a calibration running OPC for calibrating an optimum recording optical power.

15. The method according to any one of claims 12 to 14, wherein said calibration running OPC is performed so as to obtain a minimum value for a difference between said target value and a detected index detected in said calibration running OPC.

16. The method according to claim 15, wherein said calibration running OPC is performed for at least one revolution of the optical disk, and said detected index is obtained as an average of indexes measured for said at least one revolution of said calibration running OPC.

17. The method according to claim 16, wherein a parameter for calculating said average of indexes is obtained by another running OPC conducted for at least one revolution of the optical disk by an average of parameters measured for said at least one revolution.

18. The method according to claim 1, wherein said controlling step controls said recording optical power based additionally on said recording optical power.

19. The method according to claim 1, wherein said controlling step controls said recording optical power based additionally on said recording optical power and a linear velocity of the optical disk.

20. The method according to claim 9, wherein said controlling step includes calculation of a correcting factor used as an inherent value for a specified recording condition based on said linear velocity.

21. An optical disk drive for driving an optical disk by using a running optical power control (OPC), comprising:

an optical system for irradiating an optical disk with an optical spot having a recording optical power and a reproducing optical power, said recording optical power and said reproducing optical power alternately occurring for generating a mark and a space, respectively, on a track of the optical disk;

a photodetector for receiving the optical spot reflected from the optical disk as a reflected optical spot, said photodetector having a plurality of sensor areas divided at least in a tangential direction of the track; and an OPC block for receiving outputs of said photodetector to detect a front power level and a rear power level of the reflected optical spot, wherein said OPC block detects a recorded state of the mark by calculating an index of the recorded state based on said front power level and said rear power level, and controls said recording optical power based on the index of the recorded state during said running OPC.

22. The disk drive according to claim 21, wherein said OPC block controls said recording optical power based on either said front power level, said rear power level and said recording optical power, or said front power level, said rear power level, said recording optical power and a linear velocity of the optical disk, or said front power level, said rear power level, said recording optical power and a correction factor calculated from a linear velocity of the optical disk as an inherent value for a specified recording condition.

23. The disk drive according to claim 21, wherein said index of the recorded state is calculated from either said front power level (Spab), said rear power level (Spcd) and said recording optical power Pr), or said front power level (Spab), said rear power level (Spcd), said recording optical power (Pr) and a linear velocity of the optical disk, or said front power level (Spab), said rear power level (Spcd), said recording optical power (Pr) and a correction factor (k) calculated from a linear velocity of the optical disk as an inherent value for a specified recording condition.

24. The disk drive according to claim 23, wherein said index of the recorded state is obtained as either a ratio Spab/Spcd or Spcd/Spab, a ratio between Spab/Spcd or Spcd/Spab and $Pr^n$, given n being a sensitive factor of said running OPC, or ratio between Spab/Spcd or Spcd/Spab and $Pr^n \times k$, given k being a correction factor obtained from said linear velocity as an inherent value under a specified condition.

25. The disk drive according to any one of claims 24, wherein a sensitive factor of said running OPC is adjusted as an optimum value for each type of optical disks for adjusting a degree of control in said running OPC.

26. The method according to claim 21, wherein said OPC block uses said detected index as a target value for said index of recorded state during a calibration OPC on a power calibration area of the optical disk.

27. The method according to claim 21, wherein sid OPC block uses said detected index as a target value for said index of recorded state by using a calibration running OPC for calibrating an optimum recording optical power before starting actual recording on a recording area of the optical disk.

28. The method according to claim 21, wherein said OPC block uses said detected index as a target value for said index of recorded state after starting actual recording on a recording area of the optical disk by using a calibration running OPC for calibrating an optimum recording optical power.

29. The method according to any one of claims 26 to 28, wherein said OPC block controls said recording optical power so as to obtain a minimum value for a difference between said target value and a detected index-detected in said calibration running OPC.

30. The method according to claim 29, wherein said OPC block performs said calibration running OPC for at least one revolution of the optical disk, and obtains said detected index as an average of indexes measured for said at least one revolution of said calibration running OPC.

31. The method according to claim 30, wherein said OPC block obtains a parameter for calculating said average of indexes by conducting another running OPC for at least one revolution of the optical disk by an average of parameters measured for said at least one revolution.

* * * * *